(12) United States Patent
Looker

(10) Patent No.: US 6,502,280 B2
(45) Date of Patent: Jan. 7, 2003

(54) LIGHTWEIGHT HIGH CAPACITY INDUSTRIAL CASTER

(75) Inventor: Robert Looker, Carpenteria, CA (US)

(73) Assignee: Satco, Inc., El Segundo, CA (US)

( * ) Notice: Subject to any disclaimer, the term of this patent is extended or adjusted under 35 U.S.C. 154(b) by 0 days.

(21) Appl. No.: 09/738,262

(22) Filed: Dec. 13, 2000

(65) Prior Publication Data

US 2002/0069480 A1 Jun. 13, 2002

(51) Int. Cl.[7] .......................... A47B 91/00; B60B 33/00
(52) U.S. Cl. ..................................... 16/46; 16/21; 16/37
(58) Field of Search ............................... 16/46, 21, 20, 16/22, 37, 38, 26, 27

(56) References Cited

U.S. PATENT DOCUMENTS

| | | | | |
|---|---|---|---|---|
| 1,576,922 A | * | 3/1926 | Malloy ......................... | 16/100 |
| 1,711,723 A | * | 5/1929 | Cousins ......................... | 16/22 |
| 2,111,561 A | * | 3/1938 | Herold ........................... | 16/21 |
| 3,890,669 A | * | 6/1975 | Reinhards ..................... | 16/35 R |
| 4,097,954 A | * | 7/1978 | Christensen .................... | 16/21 |
| 4,348,784 A | * | 9/1982 | Fontana .......................... | 16/21 |
| 4,494,271 A | * | 1/1985 | Perlin et al. .................. | 16/18 A |
| 4,707,880 A | * | 11/1987 | Doyle et al. .................... | 16/21 |
| 5,479,677 A | * | 1/1996 | Chong ............................ | 16/21 |

OTHER PUBLICATIONS

Information Sheet—"RIOO Series Heavy Duty Forged Steel", Darnell–Rose, 1 page Jun. 1998.

* cited by examiner

Primary Examiner—Chuck Y. Mah
(74) Attorney, Agent, or Firm—Perkins Coie LLP

(57) ABSTRACT

A lightweight high capacity industrial caster which has three major parts, an upper assembly, a lower assembly, and a roller assembly. The upper assembly includes an upper plate with a first top surface and first bottom surface, the first bottom surface having a circular upper race groove within the plane of the upper plate, a kingpin having a top end and a bottom end, connected to the upper plate on the top end and extending downwardly away from the first bottom surface, the kingpin centered with respect to the circular upper race groove and an upper race insert carried in the upper race groove. The lower assembly includes a lower plate with a second top surface and second bottom surface, the second top surface having a circular lower race groove within the plane of the lower plate, a hole in the lower plate at the center of the circular lower race groove through which the kingpin extends, a lower race insert carried in the lower race groove, a first set of bearings carried in the lower race insert. Finally, the roller assembly includes two roller support members extending downwardly away from the second bottom surface, and a roller structure attached to the two roller support members and is adapted to rotate.

25 Claims, 2 Drawing Sheets

LIGHTWEIGHT HIGH CAPACITY INDUSTRIAL CASTER

FIELD OF THE INVENTION

The present invention relates to high capacity industrial casters.

BACKGROUND OF THE INVENTION

Casters have long been used to move objects, including the common examples found on shopping carts and office chairs. Casters allow a user to move a cart or chair along the floor with ease. If a user wishes to move the object in a straight line, a rigid caster may be used. In applications where straight-line movement is not feasible, a swivel caster must be used. For example, a shopping cart may have a pair of rigid casters on the back and a pair of swivel casters on the front, allowing a user to steer in the cart around the isles at the supermarket.

Casters are not limited to light duty applications such as shopping carts and office chairs, but are also used in heavy-duty applications. For example, industrial strength casters can carry more than 3500 lbs., permitting a user to move heavy objects such as bulk metals, heavy equipment and the like. Because the high stresses caused by the heavy weight, the vast majority of components of past high capacity swivel casters was constructed of heavy dropped forged steel. The resulting caster was heavy, expensive (because of the amount of steel used) and corroded easily. Moreover, the heavy weight increased transportation/operation costs because it required transporting the dead weight of the heavy caster.

A need therefore exists for a heavy-duty caster that is lightweight and consequently less expensive to maintain, operate and manufacture.

SUMMARY OF THE INVENTION

An aspect of the invention involves a lightweight high capacity industrial caster. The caster includes three major parts: an upper assembly, a lower assembly, and a roller assembly. The upper assembly includes an upper plate with a first top surface and first bottom surface, the first bottom surface having a circular upper race groove within the plane of the upper plate, a kingpin having a top end and a bottom end, connected to the upper plate on the top end and extending downwardly away from the first bottom surface, the kingpin centered with respect to the circular upper race groove and an upper race insert carried in the upper race groove. The lower assembly includes a lower plate with a second top surface and a second bottom surface, the second top surface having a circular lower race groove within the plane of the lower plate, a hole in the lower plate at the center of the circular lower race groove through which the kingpin extends, a lower race insert carried in the lower race groove, a first set of bearings carried in the lower race insert. Finally, the roller assembly includes two roller support members extending downwardly away from the second bottom surface, and a roller structure attached to the two roller support members and is adapted to rotate.

Implementation of this aspect of the invention may include one or more of the following: A bearing assembly is connected to the second bottom surface, and centered about the kingpin, and includes a second set of bearings located radially about the kingpin, the kingpin extending through the bearing assembly. A fastener attaches to the bottom end of the kingpin to hold the upper assembly and lower assembly together and is adapted to allow the lower assembly to rotate about the rotational axis relative to the upper plate.

Also, the lower race insert may be free to move laterally within the plane of the lower plate, while the upper race insert is substantially immobile in the plane of the upper plate. Alternatively, the upper race insert may be free to move laterally within the plane of the upper plate, while the lower race insert is substantially immobile in the plane of the lower plate. Preferably, the first set of bearings is a plurality of ball bearings and the second set of bearings is a plurality of tapered roller bearings, both sets of bearing constructed of a heavy weight metal selected from the group consisting of steel, iron, iron alloys and steel alloys. The upper and lower race inserts, along with the kingpin, are also preferably constructed of the heavy weight metal. The upper plate, lower plate, and the two roller support members are constructed of a light metal selected from the group consisting of aluminum and aluminum alloys. The roller assembly is offset from the rotational axis. For added strength the lower plate and the two roller support members are formed as one continuous structure.

Accordingly, it is a primary object of the present invention to provide a lightweight high capacity caster that is less costly to construct, operate and maintain. This and further objects and advantages will be apparent to those skilled in the art in connection with the drawings and the detailed description of the preferred embodiments set forth below.

BRIEF DESCRIPTION OF THE DRAWINGS

The drawings illustrate the design and utility of the preferred embodiment of the present invention, in which similar elements are referred to with common reference numerals.

DETAILED DESCRIPTION OF THE PREFERRED EMBODIMENT

The present invention resolves the shortcoming of the past casters with a lightweight high capacity caster that is less expensive to construct, operate and maintain.

Figure 1A:
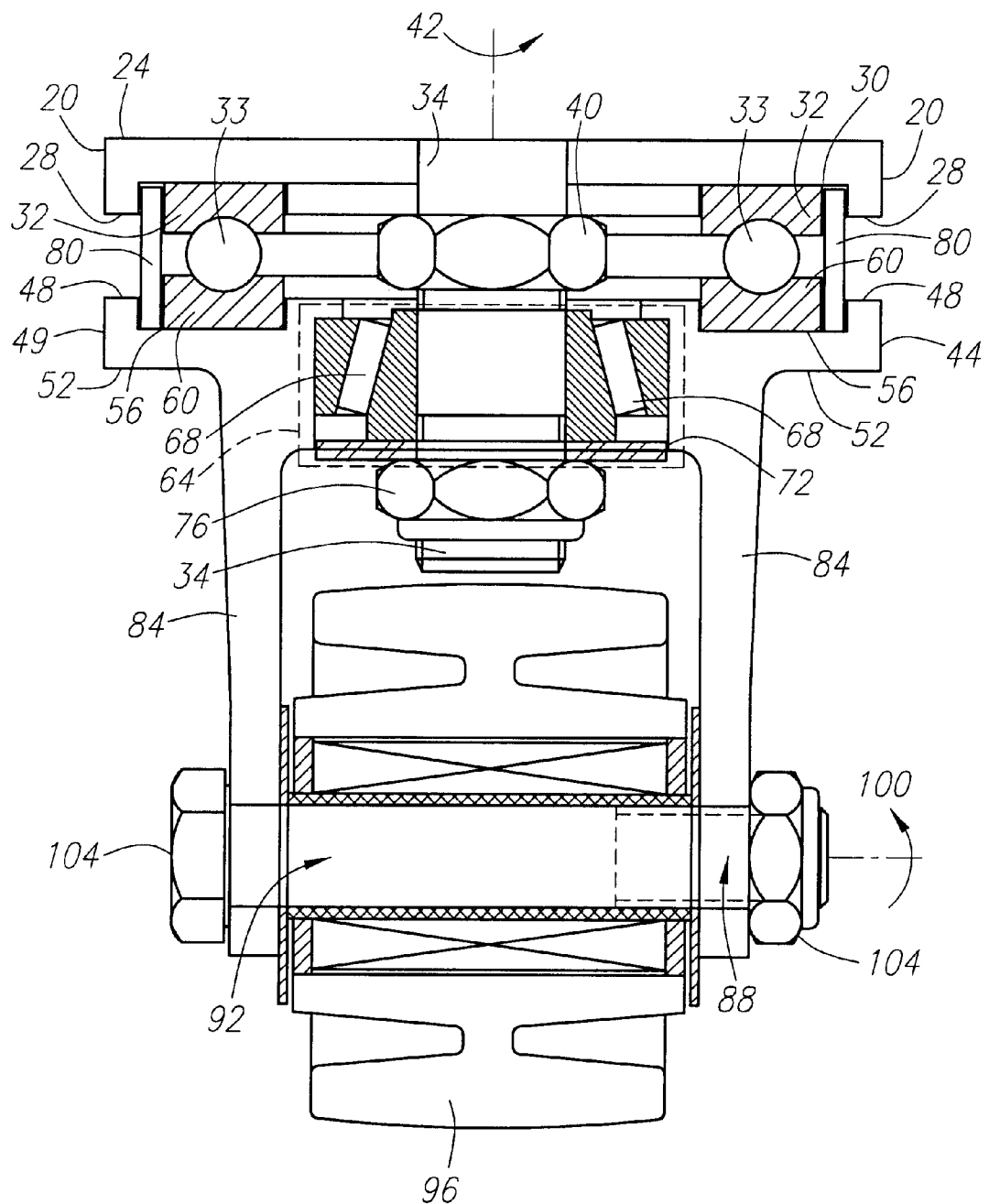
FIG. 1A is a cross sectional view of an embodiment of a lightweight, high capacity caster of the present invention.
Figure 1B:
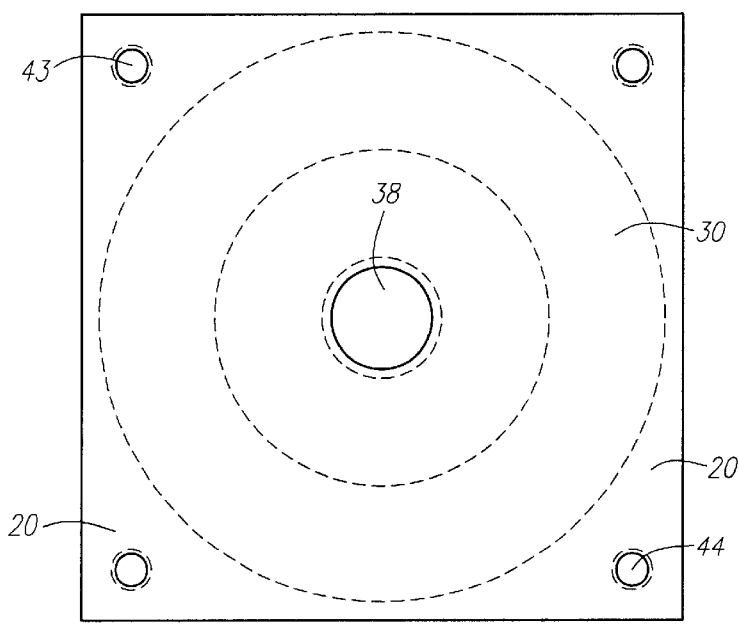
IN FIG. 1B is a bottom view of the upper plate of the lightweight, high capacity caster depicted in FIG. 1A.

With reference to FIG. 1A a lightweight high capacity caster can be generally divided into three assemblies: an upper assembly 10, a lower assembly 14 and a roller assembly 16. The upper assembly includes an upper plate 20 that contains a top surface 24 and the bottom surface 28. The upper plate 20 is preferably constructed of a lightweight metal or material, such as aluminum, aluminum alloy or plastic, or other material having similar attributes. A circular upper race groove 30 is formed into the bottom surface 28 of the upper plate 24. FIG. 1B illustrates the bottom surface 28 of the upper plate 24, with the upper race groove 30. Returning to FIG. 1A, within the upper race groove 30, is an upper race insert 32, preferably constructed of a heavy-weight metal, such as steel or iron, or other similar material. The upper race insert 32, holds a first set of bearings 33, discussed in more detail below. Extending away from the bottom surface 28 is a kingpin 34 that is connected on one end to the upper plate 24 and is centered with respect to the circular upper race groove 30.

FIG. 1B better illustrates the connection point 38 of the kingpin 34 to the upper plate 24. With reference to FIG. 1A, a jam nut 40 connects to a threaded portion of the kingpin 34, securely locking the kingpin 34 to the upper plate 20. The kingpin 34 may also connect to the top plate by any suitable connection means, including a welded joint or rivet. The kingpin 34 also defines a rotational axis 42 about which the lower assembly 16 can rotate with respect to the upper assembly 14. The upper plate 24 may also preferably contain one or more connection apertures 43 through which a bolt or screw may be inserted to connect the upper plate 24, and consequently the entire caster 8, to an object. While the connection to an object is illustrated as apertures 43, other suitable connection devices or materials may be used, such as, but not limited to bolts, rivets, welded joints, nails, and glue.

The lower assembly 16 consists of a lower plate 44 with a top surface 48 and bottom surface 52. Like the upper plate 20, the lower plate 44 is preferably constructed of a lightweight metal or material, such as aluminum, an aluminum alloy, plastic or other similar material. Also like the upper plate 20, the lower plate 44 contains a lower race groove 56 that is symmetrical to the upper race groove 30. The lower race groove 56 contains the lower race insert 60 made preferably of a heavyweight durable metal, such as steel, iron, or their alloys, or other similar material. The lower race insert 60 is preferably free to float laterally in the plane of the lower plate 44, which allows the lower race insert 60 to come into perfect alignment with the upper race insert 32. This alignment provides for better rotational movement for the caster 8 and spreads the forces imparted to the caster 8 more evenly across the entire caster 8 structure. Alternatively, the upper race insert 32 may float laterally, while the lower race insert 60 is substantially immobile. This alternate configuration would also allow for alignment of the race inserts 32, 60 and bearings 33, and more even distribution of stress forces. The lower plate 44 also has a hole in the center of the circular lower race groove 56, through which the kingpin 34 may extend.

For added strength and durability, a bearing assembly 64 may be connected to the bottom surface 52 of the lower plate 44. The bearing assembly 64 contains a second set of bearings 68 placed radially about the center of the bearing assembly 64. The bearings 68 are preferably tapered roller bearings made of a high strength heavyweight metal such as steel, or other material having similar characteristics. Alternatively, the bearings 68 may be ball or non-tapered shaped. The roller bearings 68 surround and abut the kingpin 34 that extends through the bearing assembly 64, such that the roller bearings 68 rotate about the kingpin when the lower assembly 14 rotates about the rotational axis 42. The bearing assembly 64 also contains a structure 72 that houses the roller bearing 68. The housing structure 72 not only retains the position of the bearings 68, but protects the roller bearing 68 from dust and retains the grease, or other lubricant, used to lubricate the roller bearing 68. As discussed below, the roller bearings 68 absorb some of the forces imparted on the caster 8 by the weight of the object. While it is preferable to include the bearing assembly 64, it is not necessary.

In the embodiment that includes the bearing assembly 64, the kingpin 34 extends below the bearing assembly 64, and is locked into place with a fastener 76, preferably a kingpin nut with a cotter pin. Alternatively, if the bearing assembly 64 is absent from the caster 8 design, the kingpin 34 extends below the lower plate, and is locked into place with a fastener 76, preferably a kingpin nut with a cotter pin. The kingpin 34 and the fastener 76 serve to hold the upper assembly 10 to the lower assembly 14. Sandwiched in-between the upper assembly 10 and lower assembly 14 is the first set of bearings 33, preferably steel ball bearings, but may include other shaped bearings, such as roller or tapered roller bearings. Specifically, the first set of bearings 33 is disposed of in-between the upper race insert 32 and the lower race insert 60. Also sandwiched in-between the upper and lower assemblies 10, 14, is a seal 80, preferably made of rubber or an elastic plastic. Much like the bearing housing structure 72 described above, the seal 80 protects the first set of bearings 33 and retains the lubricant used with the first set of bearings 33.

Finally, the roller assembly 16 extends downwardly away from the lower assembly 14. The roller assembly 16 contains two roller support members 84 that connect the lower plate 44 and extend downwardly away from the lower plate 44. Preferably, the roller support members 84 are constructed of a lightweight metal or material, such as aluminum, an aluminum alloy or plastic, or other material having similar characteristics. Towards the end opposite the lower assembly 14, each roller support member 84 contains a hole 88, such that each hole 88 can secure a shaft 92. A roller 96 is placed around the shaft 92, and the roller 96 can freely rotate about the axis illustrated as 100. Preferably, a pair of roller nuts 104 with cotter pins locks the shaft 92 into place. While FIG. 1 illustrates only one roller 96 disposed between two roller support members 84, more than one roller 96 and more than two roller support members 84 may be used depending on the application.

Figure 2:
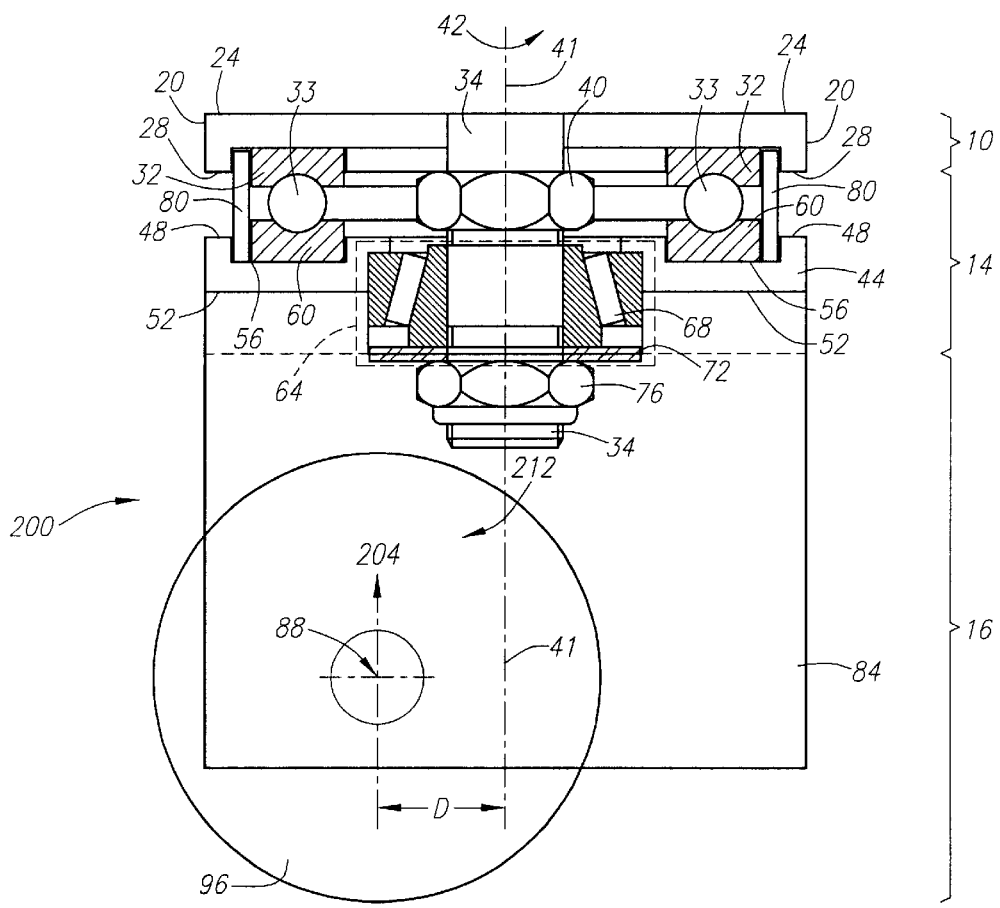
FIG. 2 is a side cross sectional view of an embodiment of a lightweight, high capacity caster with an offset roller assembly.

With respect to FIG. 2, another preferred embodiment of the caster 200 will now be described. The caster 200, like the caster 8, includes the upper, lower, and roller assemblies 10, 14, 16. The caster 200, however, has a roller 96 that is off-center from the rotational axis 42. When the caster 200 supports a load, the roller 96 transfers the load to the shaft 88, represented by force vector 204, which is displaced from the rotational axis 41 by a distance D. Force vector 212 represents the resultant force on the caster 200. The roller support members 84 transfer the force 212 to the upper and lower assemblies 10, 14. The resultant force 212 is then transferred to the tapered roller bearings 72 as they move against the kingpin 34, and is also transferred to the ball bearings 33, and consequently the upper and lower race inserts 32, 56. Because these components of the caster 208 (i.e., the upper and lower race inserts 32, 56, the bearings 33, 72, and the kingpin 34) are preferably constructed of a high strength heavyweight metal, such as steel, they can absorb the resultant force 212 with elastic deflection without damaging the caster 200. For added strength, it is preferred that the roller support member 84 be cast together with the lower plate 44, resulting in a single uniform piece. A uniform roller support member 84 more effectively transfers the load to the upper and lower assemblies 10, 14. Equally important, a uniform piece is easier and less expensive to manufacture.

The present invention is particularly advantageous over past casters for the following reasons. First, the force-subjected components are not integrated into the entire structure of the caster. Therefore, a damaged component may be replaced, if necessary, reducing maintenance costs for the casters. Second, limiting the number of components that use heavier strength materials such as steel or steel alloys, reduces manufacturing costs by reducing the need for expensive heavier materials. Third, reducing the amount of heavier materials, reduces the weight of the caster, which lowers transportation costs for the dead weight of the caster. Fourth, because the bulk of the caster components are preferably constructed of aluminum (or aluminum alloys), the caster will be resistant to corrosion. This will reduce manufacturing costs by not requiring plating, painting or other protective coatings, and reduces operation costs by extending the life of the caster.

It will be readily apparent to those skilled in the art that still further changes and modifications in the actual concepts described herein can readily be made without departing from the spirit and scope of the invention as defined by the following claims.

What is claimed is:

1. A lightweight high capacity industrial caster for moving an object, comprising:

an upper assembly, comprising;
    an upper plate with a first top surface and first bottom surface, the first bottom surface having a circular upper race groove within the plane of the upper plate;
    a kingpin having a top end and a bottom end, connected to the upper plate on the top end and extending downwardly away from the first bottom surface, the kingpin centered with respect to the circular upper race groove; and
    an upper race insert carried in the upper race groove;
a lower assembly, comprising;
    a lower plate with a second top surface and second bottom surface, the second top surface having a circular lower race groove within the plane of the lower plate;
    a hole in the lower plate at the center of the circular lower race groove through which the kingpin extends;
    a lower race insert carried in the lower race groove; and
    a first set of bearings carried in the lower race insert; and
a roller assembly, comprising;
    at least two roller support members extending downwardly away from the second bottom surface; and at least one roller structure attached to the at least two roller support members and adapted to rotate, wherein the lower race insert is free to move laterally within the plane of the lower plate and the upper race insert is substantially immobile in the plane of the upper plate.

2. The caster of claim 1, wherein the roller assembly is offset from a rotational axis defined by the kingpin.

3. The caster of claim 1, further comprising a seal disposed of in-between the upper and lower assemblies.

4. The caster of claim 1, wherein the lower plate and the two roller support members are formed as one continuous structure.

5. The caster of claim 1, wherein the upper plate comprises a structure adapted to attach to the object.

6. The caster of claim 5, wherein the structure is at least one aperture adapted to fit at least one fastener selected from the group consisting of bolts, screws, nails and rivets.

7. The caster of claim 1, wherein
    the kingpin is threaded;
    the upper plate contains a second hole adapted to receive the threaded kingpin; and
    the kingpin connects to the upper plate through the second hole.

8. The caster of claim 7, further comprising a jam nut threaded onto the kingpin, the jam nut further adapted to lock the kingpin to the upper plate.

9. The caster of claim 1, further comprising:
    a bearing assembly connected to the second bottom surface, and centered about the kingpin, the bearing assembly including a second set of bearings located radially about the kingpin, the kingpin extending through the bearing assembly; and
    a fastener attached to the bottom end of the kingpin to hold the upper assembly and lower assembly together and adapted to allow the lower assembly to rotate about the rotational axis relative to the upper plate.

10. The caster of claim 9, wherein the first set of bearings is a plurality of ball bearings and the second set of bearings is a plurality of tapered roller bearings.

11. The caster of claim 9, wherein the upper race insert, lower race insert, first set of bearings, second set of bearings and the kingpin are constructed of a heavy metal selected from the group consisting of steel, iron, iron alloys and steel alloys.

12. The caster of claim 11, wherein the upper plate, lower plate, and the at least two roller support members are constructed of a light metal selected from the group consisting of aluminum and aluminum alloys.

13. The caster of claim 9, wherein
    the fastener comprises a nut and cotter pin;
    the kingpin is threaded and contains a cotter pin hole adapted to receive the cotter pin, the nut is threaded onto the kingpin and the cotter pin is inserted into the cotter pin hole.

14. A lightweight high capacity industrial caster for moving an object, comprising:

an upper assembly, comprising;
    an upper plate having a circular upper race groove in a plane thereof;
    a kingpin connected to and extending downwardly from the upper plate, the kingpin centered with respect to the circular upper race groove; and
    an upper race insert disposed in the upper race groove;
a lower assembly, comprising;
    a lower plate having a circular lower race groove in a plane thereof;
    a hole in the lower plate through which the kingpin extends, the hole centered with respect to the circular lower race; and
    a lower race insert disposed in the lower race groove;
a first set of bearings disposed between the upper and lower race inserts; and
a roller assembly, comprising;
    a roller support member extending downwardly from the lower plate; and
    at least one rotatable roller structure attached to the roller support member;
wherein one of the lower and upper race inserts is free to move laterally within the plane of the lower and upper plate, respectively, and the other one of the lower and upper race inserts is substantially immobile, such that the lower and upper race inserts may be optimally aligned.

15. The caster of claim 14, wherein the roller assembly is offset from a rotational axis defined by the kingpin.

16. The caster of claim 14, further comprising:
    a bearing assembly connected to a bottom surface of the lower plate including a second set of bearings located radially about the kingpin, the kingpin extending through the bearing assembly; and
    a fastener attached to the bottom end of the kingpin to hold the upper assembly and lower assembly together and adapted to allow the lower assembly to rotate about a rotational axis defined by the kingpin relative to the upper plate.

17. The caster of claim 16, wherein the first set of bearings is a plurality of ball bearings and the second set of bearings is a plurality of tapered roller bearings.

18. The caster of claim 14, wherein the upper race insert, the lower race insert, the first set of bearings, and the kingpin are constructed of a heavy metal selected from the group consisting of steel, iron, iron alloys and steel alloys.

19. The caster of claim 14, wherein the upper plate, the lower plate, and the roller support member are constructed of a light metal selected from the group consisting of aluminum and aluminum alloys.

20. A lightweight high capacity industrial caster for moving an object, comprising:

an upper assembly, comprising;
　an upper plate with a first top surface and first bottom surface, the first bottom surface having a circular upper race groove within the plane of the upper plate;
　a kingpin having a top end and a bottom end, connected to the upper plate on the top end and extending downwardly away from the first bottom surface, the kingpin centered with respect to the circular upper race groove; and
　an upper race insert carried in the upper race groove;

a lower assembly, comprising;
　a lower plate with a second top surface and second bottom surface, the second top surface having a circular lower race groove within the plane of the lower plate;
　a hole in the lower plate at the center of the circular lower race groove through which the kingpin extends;
　a lower race insert carried in the lower race groove; and
　a first set of bearings carried in the lower race insert; and a roller assembly, comprising;
　at least two roller support members extending downwardly away from the second bottom surface; and
　at least one roller structure attached to the at least two roller support members and adapted to rotate, wherein the upper race insert is free to move laterally within the plane of the upper plate and the lower race insert is substantially immobile in the plane of the lower plate.

21. The caster of claim 20, wherein the roller assembly is offset from a rotational axis defined by the kingpin.

22. The caster of claim 20, further comprising a seal disposed of in-between the upper and lower assemblies.

23. The caster of claim 20, wherein the lower plate and the two roller support members are formed as one continuous structure.

24. The caster of claim 20, wherein the upper plate comprises a structure adapted to attach to the object.

25. The caster of claim 20, wherein the kingpin is threaded;

the upper plate contains a second hole adapted to receive the threaded kingpin; and the kingpin connects to the upper plate through the second hole.

* * * * *